United States Patent [19]

Takei

[11] Patent Number: 5,530,303

[45] Date of Patent: Jun. 25, 1996

[54] LINEAR DIRECT CURRENT MOTOR

[75] Inventor: Seiji Takei, Kanagawa, Japan

[73] Assignee: Nippon Thompson Co., Ltd., Tokyo, Japan

[21] Appl. No.: 276,461

[22] Filed: Jul. 18, 1994

[30] Foreign Application Priority Data

Jul. 16, 1993 [JP] Japan ................................ 5-043943 U

[51] Int. Cl.$^6$ .................................................. H02K 41/00
[52] U.S. Cl. ............................................................ 310/12
[58] Field of Search ............................... 310/12, 13, 68 B

[56] References Cited

U.S. PATENT DOCUMENTS

| | | | |
|---|---|---|---|
| 4,638,192 | 1/1987 | von der Heide | 310/12 |
| 4,768,357 | 9/1988 | Ohtake | 66/75.2 |
| 4,952,011 | 8/1990 | Ishii et al. | 350/6.5 |
| 5,047,676 | 9/1991 | Ichikawa | 310/12 |
| 5,087,844 | 2/1992 | Takedomi et al. | 310/12 |
| 5,229,669 | 7/1993 | Takei | 310/12 |
| 5,359,245 | 10/1994 | Takei | 310/12 |

*Primary Examiner*—Thomas M. Dougherty
*Attorney, Agent, or Firm*—Sughrue, Mion, Zinn, Macpeak & Seas; Richard C. Turner; Peter A. Mckenna

[57] ABSTRACT

A linear direct current motor that achieves compact size is described.

A magnetic sensor is arranged within an armature coil of the primary side, and the signal emitted in response to a field magnet of the secondary side by that magnetic sensor is obtained as a reference position signal for relative movement of the primary and secondary sides. As a result, the space occupied by the constitution for obtaining the reference position signal is essentially zero, thereby offering the advantage described above.

11 Claims, 16 Drawing Sheets

LINEAR DIRECT CURRENT MOTOR

BACKGROUND OF THE INVENTION

1. Field of the Invention

The present invention relates to a linear direct current motor commonly used for moving an object to be moved with high accuracy in, for example, a motion mechanism such as a machine tool or industrial robot.

2. Description of the Prior Art

FIG. 1 shows a drive unit containing a linear direct current motor of the prior apt. Furthermore, this drive unit has a guide unit for guiding an object added to a linear direct current motor.

As shown in the drawing, this drive unit has a long base member 1 and moving object 2 which moves along said base member 1. More specifically, a plurality of rollers (not shown) are provided on moving object 2, and these rollers roll over a track (not shown) formed along the lengthwise direction in base member 1.

On the other hand, the linear direct current motor which composes the above-mentioned guide unit together with a drive unit is composed in the manner described below.

As shown in the drawing, said linear direct current motor is composed of a primary side, equipped with a large number of armature coils 7 arranged in a row in the lengthwise direction of base member 1 on said base member 1, and a secondary side, having a field magnet (not shown) attached to the bottom surface of moving object 2 to as to oppose each of said armature coils 7. Said field magnet is magnetized so that a plurality of N and S magnetic poles are alternately arranged along the direction in which moving object 2 is to move, namely the lengthwise direction of base member 1.

Overhang 1a is formed on one side of base member 1, and a linear scale 4 is provided on said overhang 1a roughly over its entire length. Reflecting portions and non-reflecting portions are formed alternately and precisely on this linear scale 4 in its lengthwise direction. In contrast, small bracket 2a is provided on the side of moving body 2, and light emitting element 5a and light receiving element 5b are mounted on said small bracket 2a.

In the drive unit of said constitution, by supplying a prescribed current to armature coils 7, thrust is produced based on Fleming's left hand rule between the primary and secondary sides. For example, if base member 1 to which the primary side is coupled, is taken to be the stationary side, moving body 2 integrated into a single unit with the secondary side is moved by this thrust.

In addition, the above-mentioned linear scale 4 is used for detection of the position of the secondary side with respect to the primary side. Namely, light is irradiated onto linear scale 4 by light emitting element 5a accompanying movement of the secondary side, and reflected light from each reflecting potion of linear scale 4 is received by light receiving element 5b to obtain pulse signals which are then counted.

However, a position to serve as a reference must be established during counting of pulse signals. The following constitution is commonly employed for that purpose.

As shown in FIG. 2, light blocking plate 10 is installed on base member 1 at the position established to be the reference. A transmission type photosensor 11 is then attached to moving object 2 in order to detect this light blocking plate 10. Photosensor 11 is equipped with a light emitting element and light receiving element. A detection signal is obtained by interrupting the output from this light receiving element based on illuminating light emitted from said light emitting element being blocked by light blocking plate 10. The above-mentioned pulse signals are then counted using this detection signal as the reference position signal.

As is clear from the above, photosensor 11 and light blocking plate 10 are provided in order to obtain a reference position signal for relative movement of the primary side and secondary side in the linear direct current motor of the prior art. Since the space occupied by this photosensor 11 and light blocking plate 10 is relatively large, said direct current linear motor of the prior art has problems left to be solved in terms of attempting to make the size of this linear direct current motor more compact.

SUMMARY OF THE INVENTION

In consideration of the above-mentioned disadvantages of the prior art, the object of the present invention is to provide a linear direct current motor that achieves compact size.

The linear direct current motor according to the present invention is equipped with a primary side containing armature coils; a secondary side having a field magnet, which is magnetized by arranging different magnetic poles alternately along the direction of relative movement with respect to said primary side, and which is arranged in opposition to said armature coils; and, a detection device which detects the relative position of said primary side and said secondary side; wherein, said detection device has a magnetic sensor which is arranged within said armature coils and emits a signal in response to said field magnet, and said signal is used as a reference position signal.

DESCRIPTION OF THE PREFERRED EMBODIMENTS

The following provides an explanation of a drive unit containing the linear direct current motor as claimed in the present invention while referring to the attached drawings. Furthermore, this linear direct current motor is of the moving magnet type.

The linear direct current motor as claimed in the present invention is composed of a primary side and secondary side, and in the present embodiment, the primary side is explained in terms of the electrical power supply side, moreover, stationary side, while the secondary side is explained in terms of the moving side.

To begin with, the following provides an explanation of the guide unit which performs mutual guidance of these primary and secondary sides.

Figure 1:
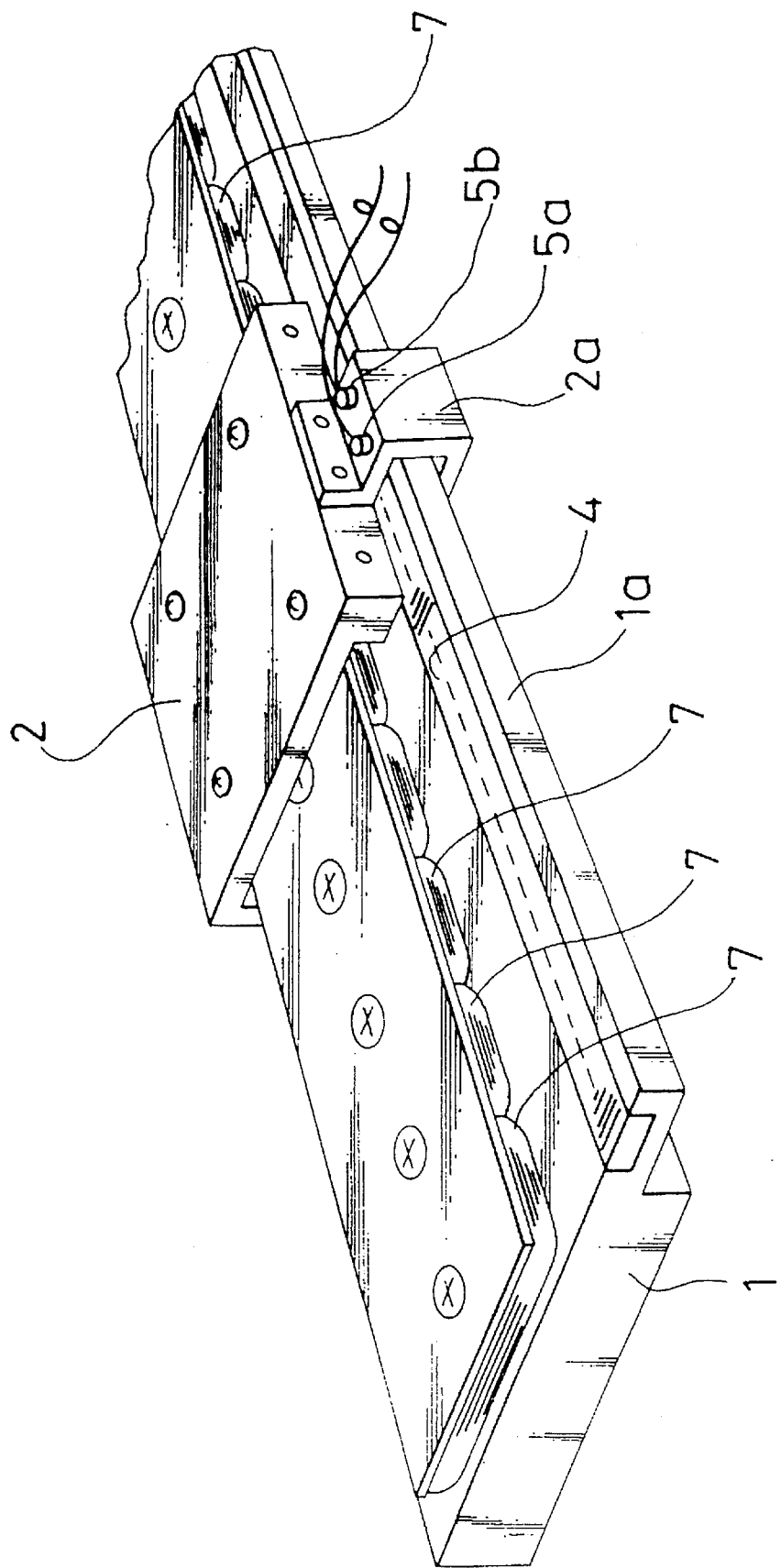
FIG. 1 is a perspective view of the essential portion of a drive unit of the prior art.
Figure 2:
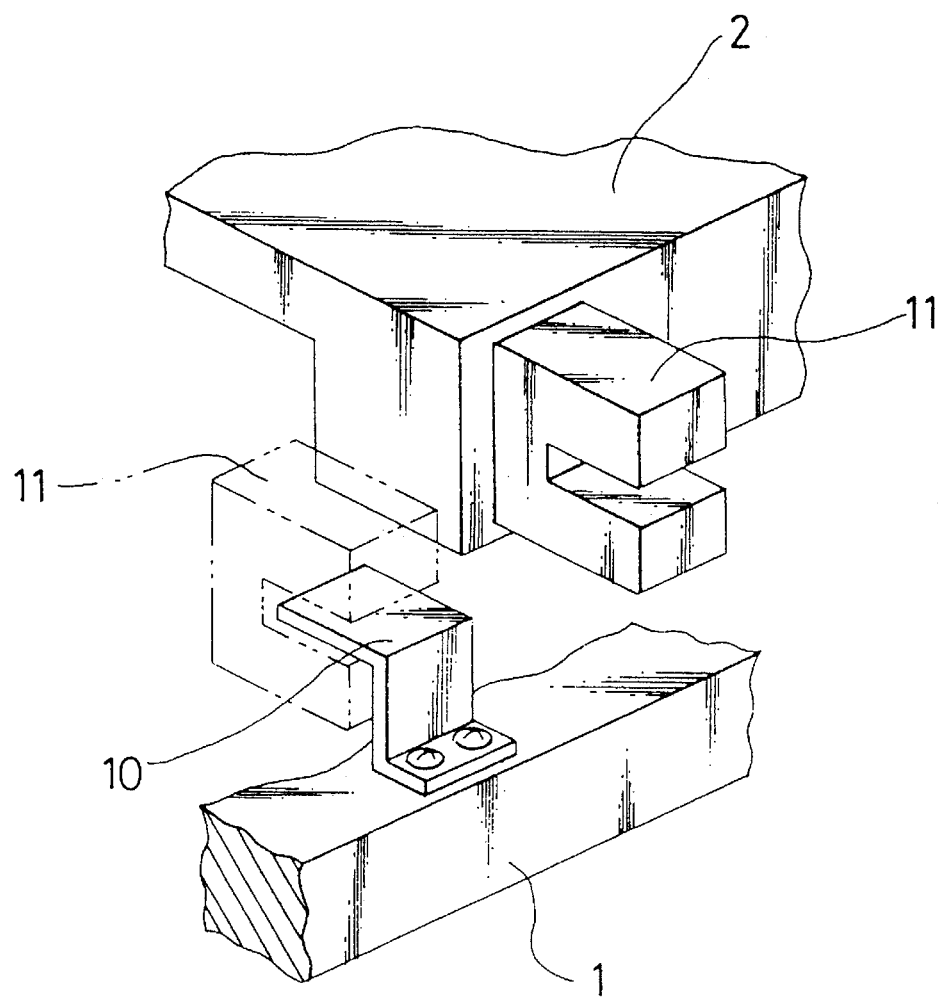
FIG. 2 is a perspective view of a detection device incorporated in the drive unit shown in FIG. 1.
Figure 3:
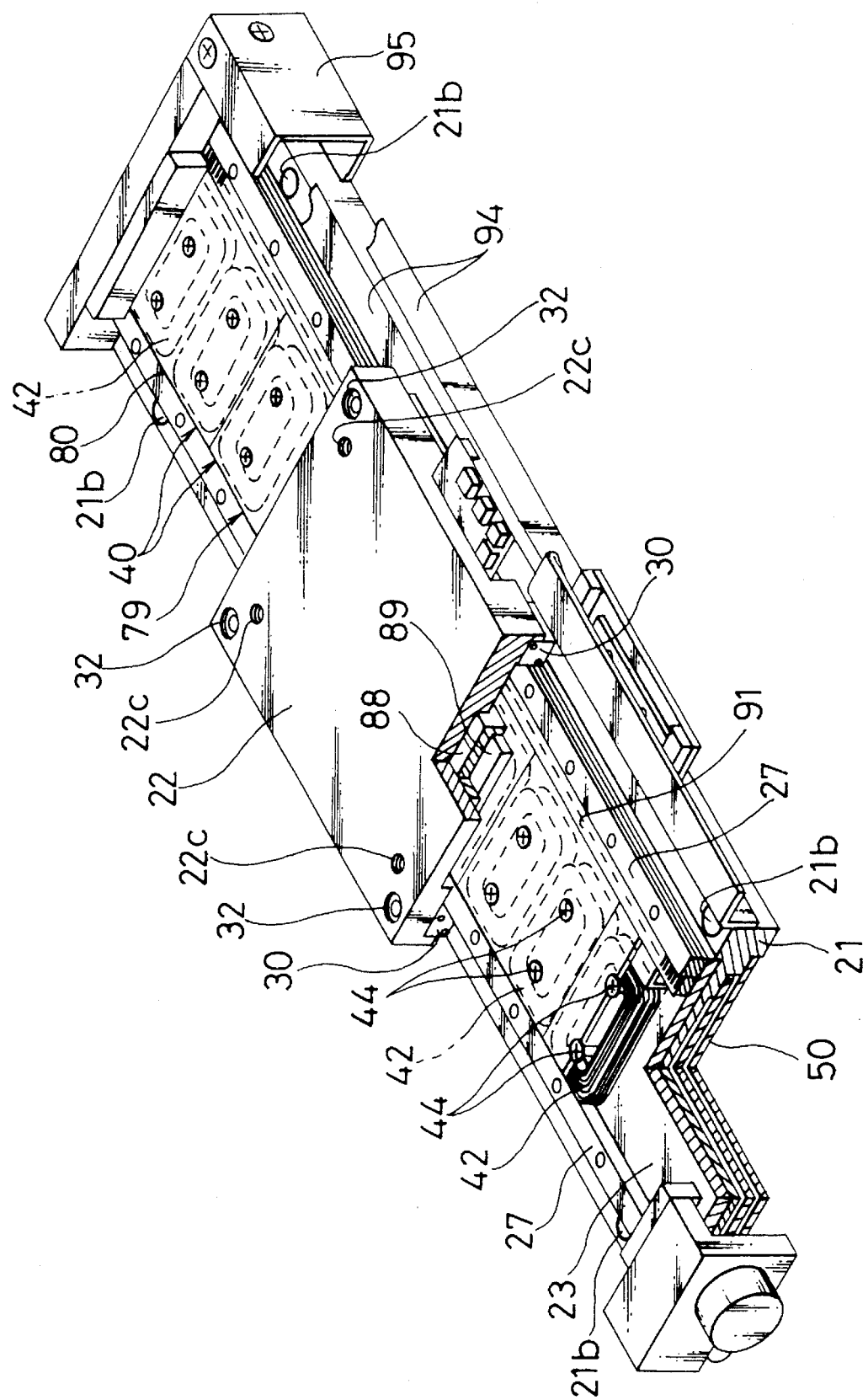
FIG. 3 is a perspective view, including a partial cross-section, of the drive unit as claimed in the present invention.
Figure 4:
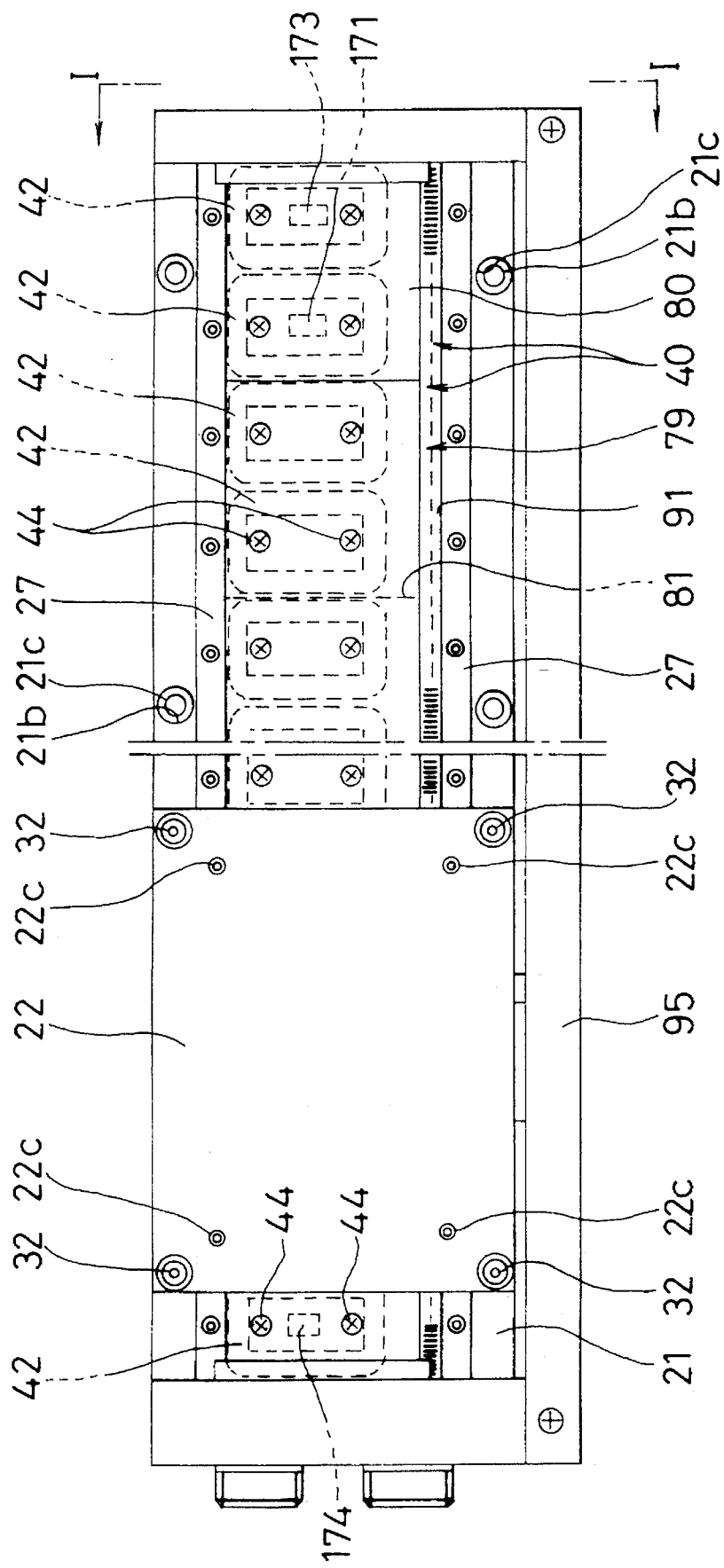
FIG. 4 is an overhead view, including a partial cross-section, of the drive unit shown in FIG. 3.
Figure 5:
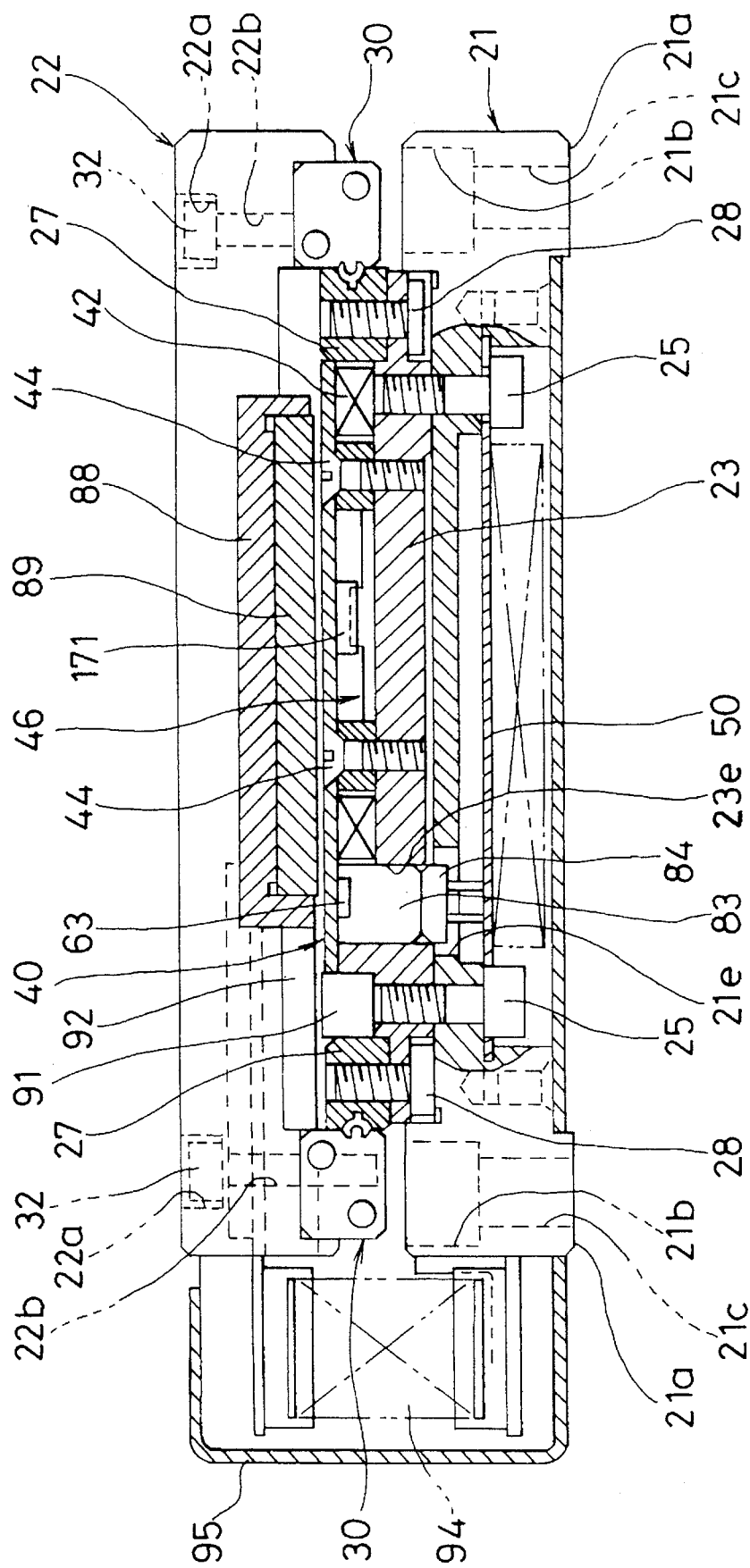
FIG. 5 is a view, including a partial cross-section, taken along I—I relating to FIG. 4.

As shown in FIGS. 3 through 5, this guide unit has bed 21 formed roughly into the overall shape of, for example, a rectangle, and table 22 to move along the lengthwise direction of said bed 21. As shown in FIGS. 3 through 5, coil yoke 23, formed into roughly a rectangular shape and having nearly the same length as bed 21, is arranged on the upper surface of said bed 21, and is fastened to said bed 21 by a plurality of bolts (with hexagon sockets, see FIG. 5) 25.

Two track rails in the form of track rails 27 are arranged on both sides of the upper surface of said coil yoke 23 along the lengthwise direction of said coil yoke 23, and are fastened to said coil yoke 23 by a plurality of countersunk head screws 28 (see FIG. 5).

Figure 6:
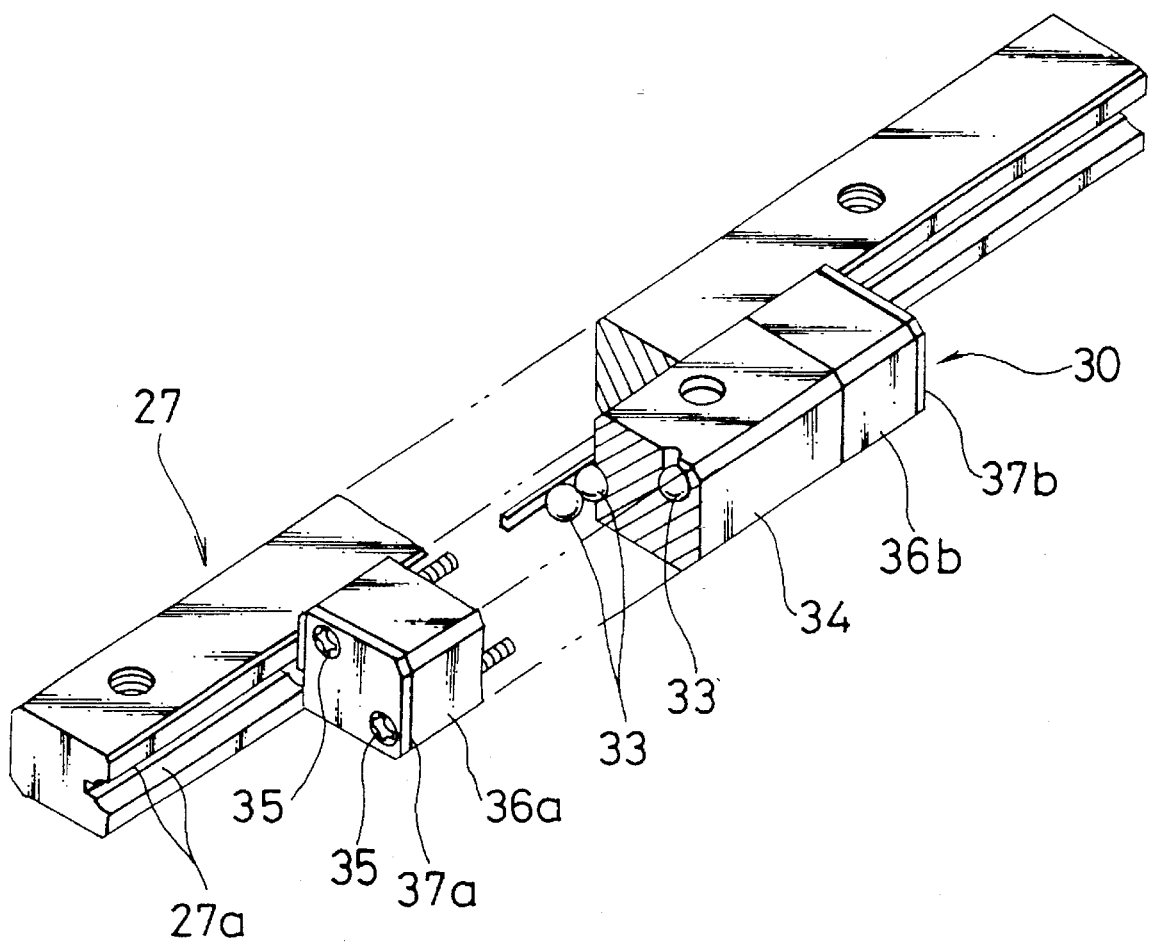
FIG. 6 is a perspective view, including a partial cross-section, of a track rail and slide member equipped on the drive unit shown in FIGS. 3 through 5.

As shown in FIG. 6, a track in the form of a single track groove 27a, having a roughly semi-circular shaped cross-section, is formed in the outside of the above-mentioned track rail 27. As is clear from FIGS. 3 and 5, a slider in the form of slide member 30, able to freely perform relative motion with respect to said track rail 27, is arranged on the outside of said track rail 27, and is fastened to the lower surface of table 22 by, for example, two bolts (with hexagon heads) 32. Furthermore, as shown in FIG. 5, countersunk portions 22a and insertion holes 22b are formed in table 22 into which the head portions and threaded portions, respectively, of bolts 32 are inserted. Bolts 32 are embedded in these countersunk portions 22a and insertion holes 22b, and do not protrude from the upper surface of table 22.

A rolling element circulating path (not shown) is formed in the above-mentioned slide member 30, and rolling elements in the form of a large number of balls 33 are arranged and contained within said rolling element circulating path. These balls 33 bear the load between track rail 27 and slide member 30 by circulating while rolling over track groove 27a of track rail 27 accompanying movement of slide member 30 with respect to track rail 27.

As shown in FIG. 6, the above-mentioned slide member 30 has casing 34, a pair of end caps 36a and 36b coupled to both ends of said casing 34 by countersunk head screws 35, and two seals 37a and 37b fastened to the outer surfaces of both of said end caps 36a and 36b. The above-mentioned rolling element circulating path is composed of a load bearing track groove and return path formed mutually in parallel and passing linearly through casing 34, and a pair of roughly arc-shaped direction changing paths formed in both end caps 36a and 36b which connect both ends of said load bearing track groove and return path. Furthermore, said load bearing track groove opposes track groove 27a of track rail 27.

The guide unit of the constitution described above is fastened to a flat mounting surface equipped on, for example, a machine tool (not shown) by a plurality of bolts (with hexagon sockets: not shown). Consequently, as shown in FIG. 5, bed 21 has flat mounting bottom surface 21a for anchoring said bed 21 to said mounting surface. As shown in FIGS. 3 through 5, countersunk portions 21b and insertion holes 21c are formed in both sides of bed 21 into which the head portions and threaded portions of the above-mentioned bolts for fastening said bed are respectively inserted. Said bolts are embedded in these countersunk portions 21b and insertion holes 21c, and do not protrude from the upper surface of bed 21. In addition, as shown in FIGS. 3 and 4, for example, four threaded holes 22c are formed in the four corners of the upper surface of table 22 able to move with respect to this bed 21, and a table (not shown) equipped on an apparatus on which said drive unit is equipped is fastened to said table 22 by bolts (not shown) screwed into these threaded holes 22c.

Continuing, the following provides a detailed description of the primary and secondary sides of the direct current linear motor which are mutually guided by the guide unit having the constitution described above.

Figure 7:
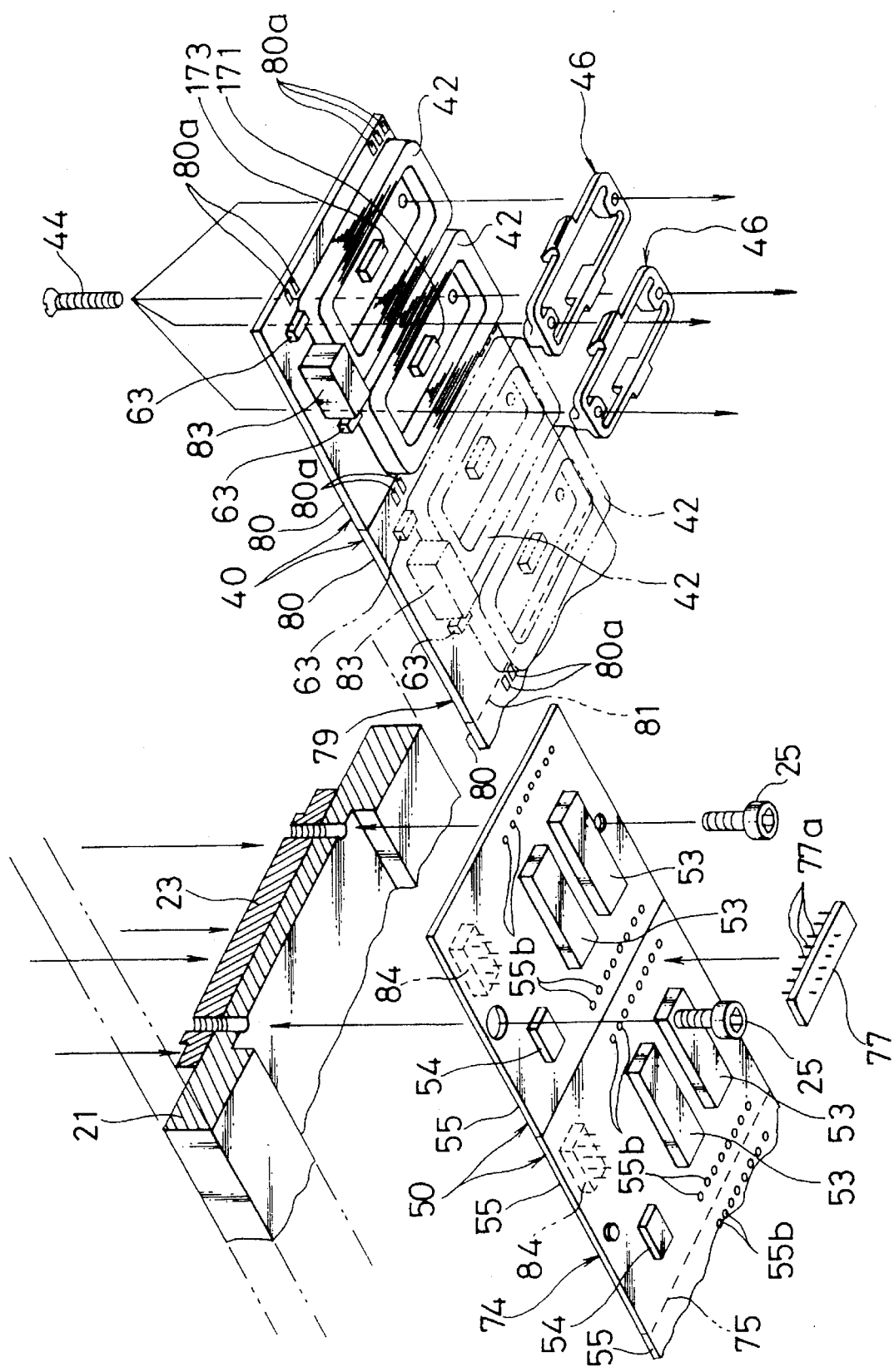
FIG. 7 is an exploded perspective view, including a partial cross-section, of the essential portion of a linear direct current motor contained in the drive unit shown in FIGS. 3 through 5.

To begin with, as shown in FIGS. 3 through 5 and 7, the primary side has the previously described coil yoke 23 installed on bed 21, coil substrate 40 arranged along the lengthwise direction of said coil yoke on the upper surface of said coil yoke 23, and, for example, 14 armature coils 42 supported by being affixed in a row along the direction in which the above-mentioned table 22 is to move over the lower surface of said coil substrate 40, namely the side of coil yoke 23. Furthermore, each armature coil 42 is wound into roughly the shape of a rectangular loop. In addition, as shown in FIGS. 5 and 7, Hall effect elements 63 are provided corresponding to each armature coil 42 on coil substrate 40. These Hall effect elements 63 compose a drive circuit together with each electronic component and so forth provided on a circuit substrate to be described later. Said drive circuit is for performing the supply of electricity and so forth to each of the above-mentioned armature coils 42. Each Hall effect element 63 emits a signal corresponding to the amount of the lines of magnetic force emitted by a field magnet when said field magnet equipped on the secondary side (to be described later) approaches. Thus, the supply of electricity to each of the above-mentioned armature coils 42 and its interruption is controlled based on this signal.

Each of the above-mentioned armature coils 42 and coil substrate 40 are fastened together to coil yoke 23 to the outside of said coil substrate 40 by fastening members in the form of countersunk head screws 44, for example, two each of which are inserted for each of said armature coils 42.

As shown in FIGS. 5 and 7, spacer assemblies 46 are juxtaposed between coil substrate 40 fastened by countersunk head screws 44 and coil yoke 23 into which said countersunk head screws 44 are screwed. These spacer assemblies 46 are provided so that deformation, such as warping and so forth, does not occur in coil substrate 40 caused by tightening of countersunk head screws 44, and are fit inside each armature coil 42.

Next, the following provides an explanation of the circuit substrate for performing supply of electricity and so forth to each of the above-mentioned armature coils 42.

As shown in FIGS. 3, 5 and 7, circuit substrate 50 is arranged in parallel with coil substrate 40 on the lower surface of bed 21 on which said coil substrate 40 is installed on its upper surface with coil yoke 23 in between. Moreover, said circuit substrate 50 is fastened to said base member 21 by a plurality of bolts (with hexagon sockets) 25. Furthermore, these bolts 25 are fastened to bed 21 of the above-mentioned coil yoke 23.

As shown in FIG. 7, the above-mentioned circuit substrate 50 is composed of a plurality of separate portions 55 joined together, each provided with a drive circuit composed of electronic components 53, 54 and so forth. These separate portions 55 are provided corresponding to each unit of two armature coils each of the fourteen armature coils 42 provided in a row. Thus, the number of these separate portions 55, in this case, is seven.

The drive circuit provided on each of the above-mentioned separate portions 55 contains one set of circuit portions supplying excitation current to one armature coil 42, or in other words, a circuit corresponding to two armature coils 42.

Continuing, the following provides a detailed description of the separate constitution of the above-mentioned circuit substrate 50 and coil substrate 40 arranged above it.

To begin with, the following provides an explanation of circuit substrate 50.

Figure 8:
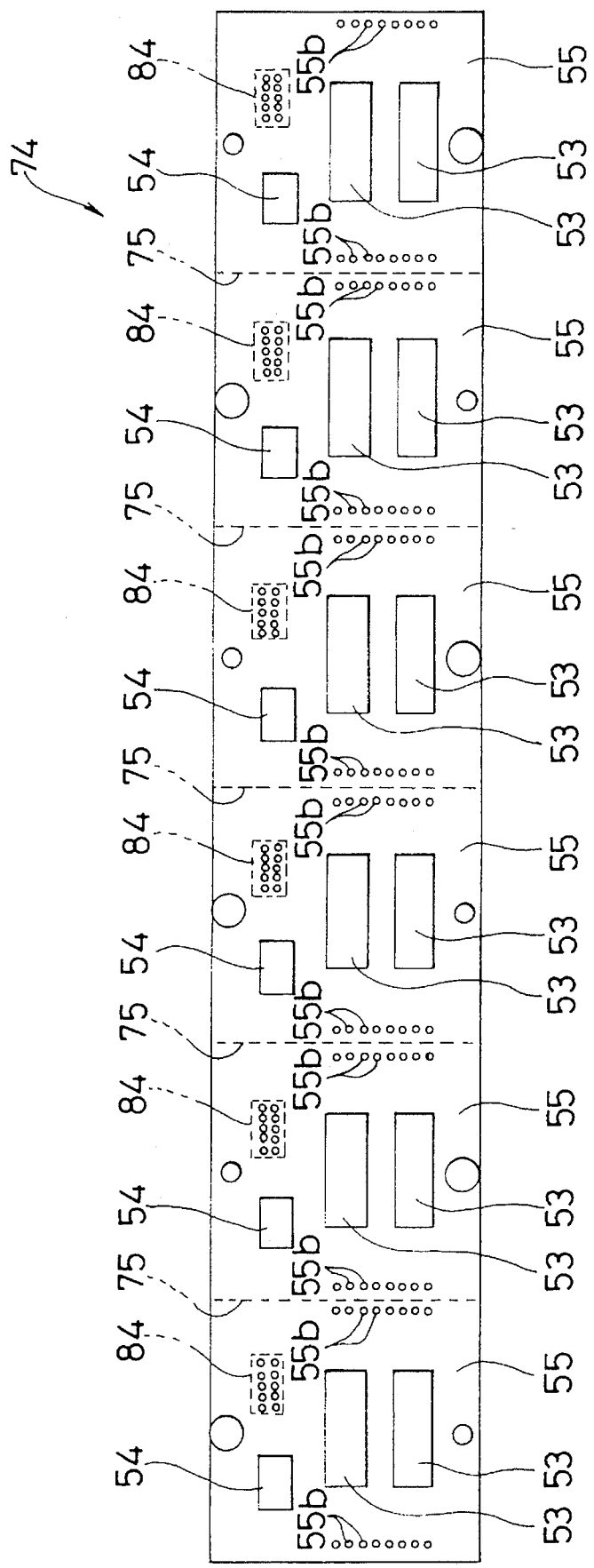
FIG. 8 is an overhead view of the base substrate to be incorporated in the drive unit shown in FIGS. 3 through 5.
Figure 9:
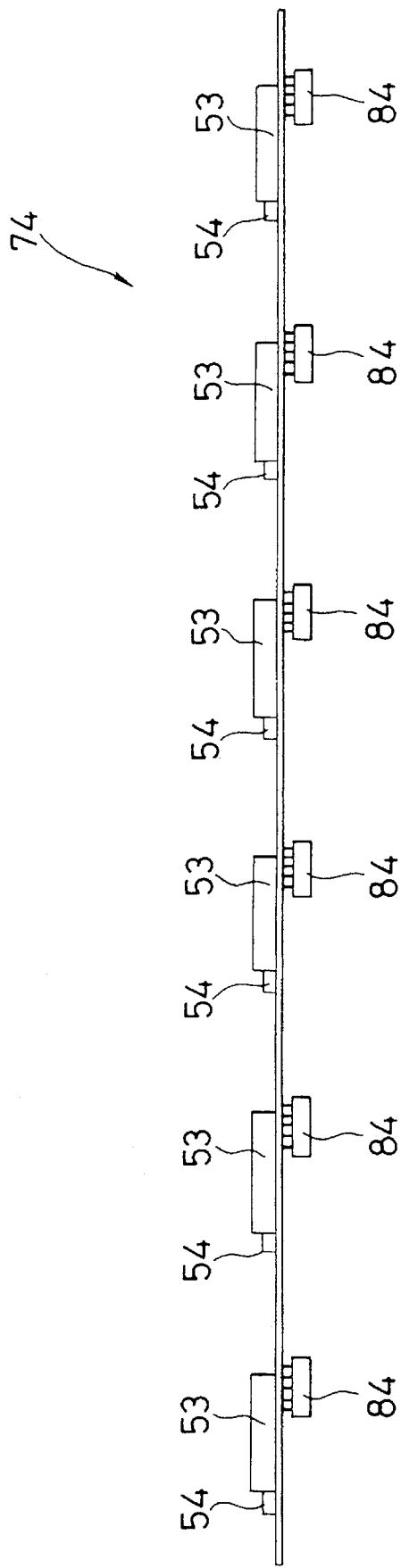
FIG. 9 is a front view of the base substrate shown in FIG. 8.
Figure 10:
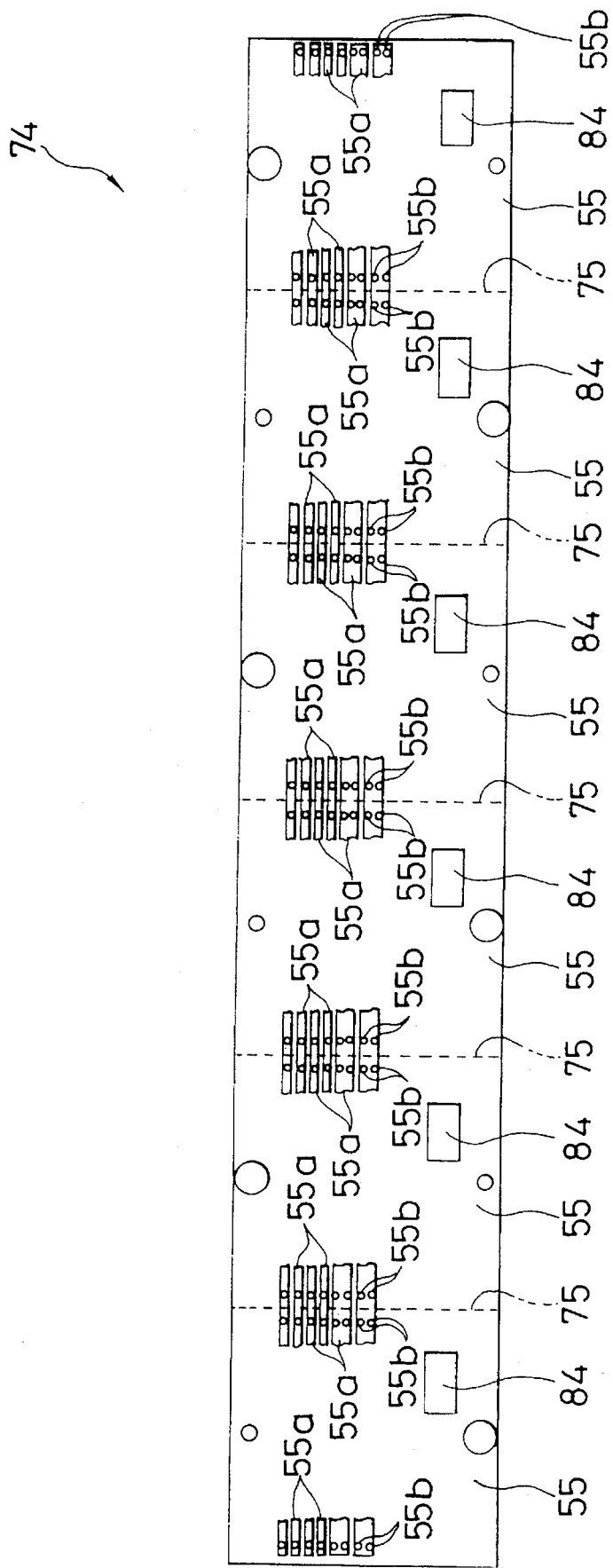
FIG. 10 is a bottom view of the base substrate shown in FIGS. 8 and 9.

In the case of fabricating this circuit substrate 50, a base substrate 74, having the base length shown in FIGS. 8 through 10, is made available. As is clear from FIGS. 8 and 10, this base substrate 74 is composed of, for example, six separate portions 55, explained based on FIG. 7, joined into a single unit. As was previously described, these separate portions 55 are provided with a drive circuit that performs supply of electrical power and so forth to two armature coils 42 each grouped in the form of individual units. Furthermore, as is shown in FIGS. 8 and 10, marks in the form of broken lines 75 are printed on both the top and bottom surfaces of base substrate 74 for distinguishing each separate portion 55. In addition, as shown in FIG. 10, connection terminals 55a possessed by the drive circuit of each separate portion 55 are arranged on the end of each separate portion 55 in the direction of connection, and are connected between mutually adjacent separate portions 55, and more specifically, into a single unit over the above-mentioned broken line 75.

Since the previously described circuit substrate 50 must link together seven of the above-mentioned separate portions 55, said circuit substrate 50 is completed by severing one of the six separate portions 55 possessed by the above-mentioned base substrate 74 along broken line 75 to separate, arranging this separated separate portion 55 in a row at one end of unseparated base substrate 74 as shown in FIG. 7, and mutually connecting their corresponding connection terminals.

Furthermore, in FIG. 7, connection between the above-mentioned separate portions 55 and base substrate 74 is performed by a single connection component 77 having terminals 77a fit into through holes 55b (also shown in FIGS. 8 and 10) provided at the portion of both connection terminals 55a (see FIG. 10). Furthermore, although connection between corresponding connection terminals 55a may be performed using copper wire and so forth, by arranging connection terminals 55a of separate portions 55 on the ends in each connecting direction as described above and performing connection using these connection components 77, in addition to connection of connection terminals 55a being able to be performed all at once, connections are reinforced due to the rigidity of said connection components 77. In addition, in addition to using components that simply act to make electrical connections, electronic components such as IC and so forth may also be used for connection components 77.

The following provides an explanation of coil substrate 40.

Although the overall coil substrate 40 is not shown, in the case of fabricating this coil substrate 40, a base substrate 79 of a length nearly equal to base substrate 74 for the above-mentioned circuit substrate 50 is made available as shown in FIG. 7. This base substrate 79 is composed by linking together six separate portions 80 into a single unit in the same manner as base substrate 74 for circuit substrate 50. As shown in the drawing, two armature coils 42 each are affixed, grouped together in units, on these six separate portions 80, thus making the total number of armature coils 42 arranged in a row on base substrate 79 twelve. Furthermore, as shown in FIGS. 7 and 4, marks in the form of broken lines 81 are printed on the top surface of base substrate 79 to distinguish these separate portions 80. As shown in FIG. 7, circuit substrate 50 is formed by joining and connecting a single separate portion 80 separated from another base substrate not shown to one end of this unseparated base substrate 79. Furthermore, in FIG. 7, reference numeral 80a indicates connection terminals provided on each of separate portion 80.

However, in the description thus far, although two armature coils 42 each and a drive circuit for driving said armature coils 42 are separated into units with respect to coil substrate 40 and circuit substrate 50, three or more armature coils 42 and their drive circuit may also be separated into their respective units. In addition, although base substrate 74, which supports twelve armature coils 42, and base substrate 79, on which a plurality of drive circuits are arranged in a row corresponding to two of these armature coils 42 each, are made available during fabrication of the drive unit equipped with a total of fourteen armature coils 42 in the present embodiment, it is only natural that the setting of the total length of these base substrates 74 and 79, namely the number of armature coils and drive circuits to be equipped on these, can be suitably changed.

In addition, although coil substrate 40 and circuit substrate 50 are composed by separating at least one of separate portions 50 and 80 provided on base substrate 74 and 79, and joining it to unseparated base substrates 74 and 79 in the present embodiment, in the case the operating stroke of the drive unit to be fabricated is shorter than the total length of base substrates 74 and 79, at least one of each of separate portions 55 and 80 provided on each of said base substrates 74 and 79 should be cut away as necessary.

Furthermore, as shown in FIGS. 5, 7 and 8 through 10, coil substrate 40 and circuit substrate 50, which are arranged to be mutually separated by bed 21 and coil yoke 23, are connected by connecting a plurality of, in this case seven, of connection devices in the form of both corresponding male and female connectors 83 and 84 provided on mutually opposing sides of both said substrates. One each of these connectors 83 and 84 are arranged with respect to each separate portion 55 and 80 each provided with two armature coils 42 each and their drive circuit grouped into a unit as previously described. As shown in FIG. 5, said connectors 83 and 84 are mutually connected through apertures 21e and 23e formed in bed 21 and coil yoke 23. Thus, since one each of connectors 83 and 84 are provided for each of separate portions 55 and 80 of coil substrate 40 and circuit substrate 50, when mutually assembling both said separate portions 55 and 80, the directions of both can be recognized both quickly and easily, thus facilitating assembly work. Furthermore, connection of corresponding separate portions 55 and 80 may be performed by lead wires and not by connectors as described above. In addition, with respect to the number of connectors, besides providing only one connector for each of separate portions 55 and 80 as mentioned above, two or more connectors may also be provided.

On the other hand, the secondary side is composed in the manner described below.

Figure 11:
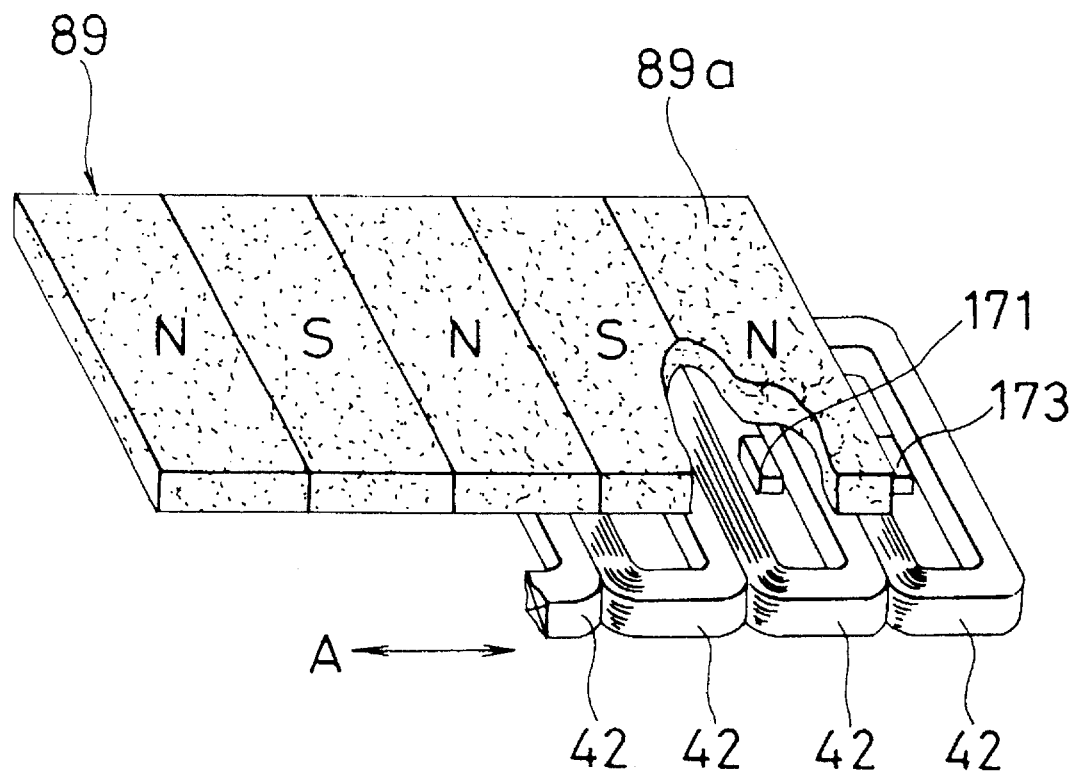
FIG. 11 is a perspective view, including a partial cross-section, of the essential portion of the linear direct current motor contained in the drive unit shown in FIGS. 3 through 5.

As shown in FIGS. 3 and 5, said secondary side has magnet yoke 88, mounted on the lower side of table 22, and field magnet 89 anchored on the lower surface of said magnet yoke 88 to oppose each of the above-mentioned armature coils 42 of the primary side. As shown in FIG. 11, the overall shape of field magnet 89 is formed into roughly that of a rectangular plate, and a plurality of N and S magnetic poles, for example 5, are magnetized so as to be alternately arranged in a row along direction A in which relative movement is performed by the primary and secondary sides, namely the lengthwise direction of bed 21.

In the drive unit of said constitution, by supplying a prescribed current to armature coils 42, thrust is produced based on Fleming's left hand rule between the primary and secondary sides. For example, if bed 21, to which the primary side is coupled, is taken to be the stationary side, table 22, integrated into a single unit with the secondary side, is moved by this thrust.

In the drive unit having said constitution, a detection device having the constitution described below is provided for detection of the relative positions of the above-mentioned primary side and secondary side.

Namely, said detection device is composed of linear magnetic scale 91 shown in FIGS. 3 through 5, and magnetic sensor portion 92 shown in FIG. 5. Said linear magnetic scale 91 extends in the direction of movement of the above-mentioned secondary side, and a large number of N and S magnetic poles are alternately magnetized at a precise pitch along its lengthwise direction as is clear from FIG. 12.

Furthermore, as shown in FIGS. 3 through 5, cables 94 for obtaining signals from the above-mentioned magnetic sensor portion 92, and cover 95, which covers said cables 94, are provided. Said cables 94 consist of flexible cables.

Figure 12:
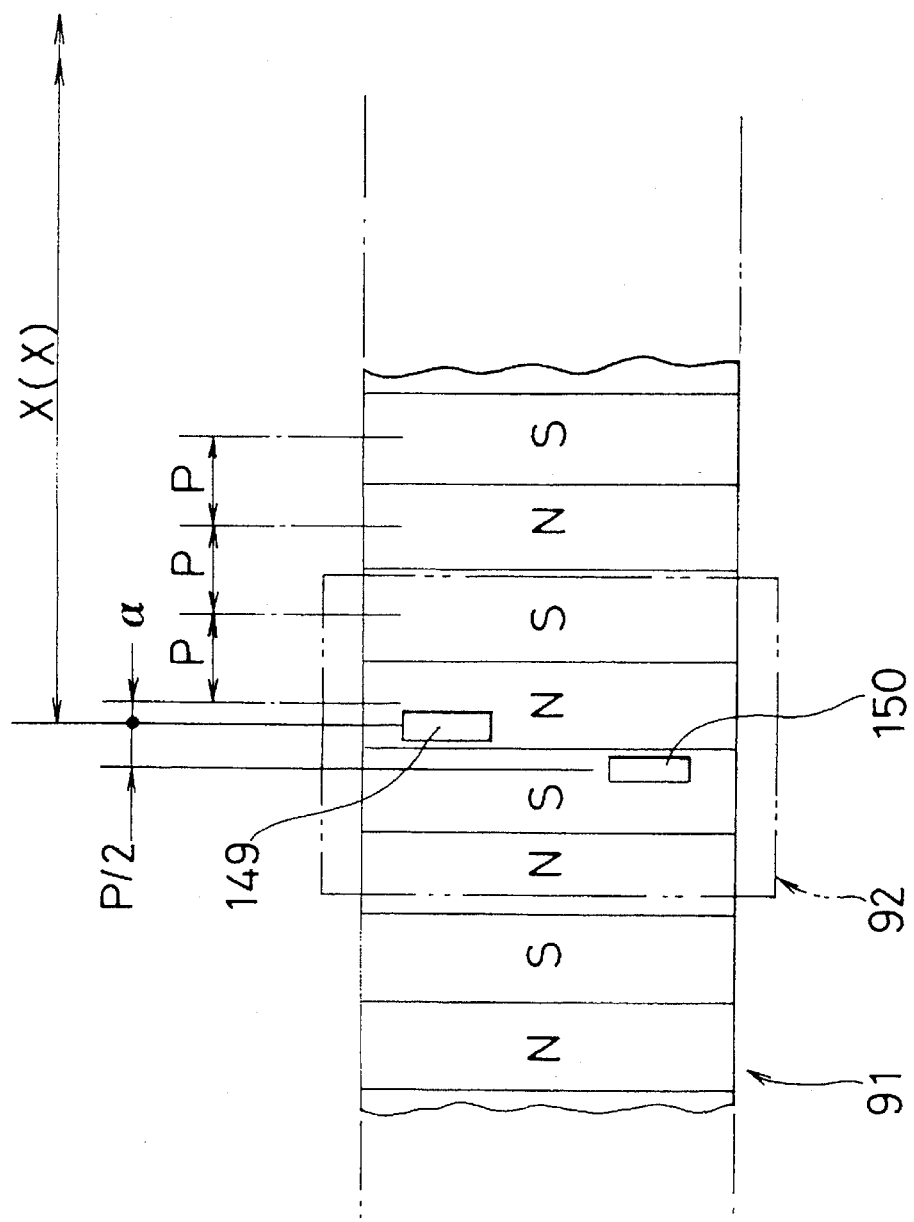
FIG. 12 is an overhead view showing the linear magnetic scale provided in the drive unit shown in FIGS. 3 through 5, and the magnetic sensor portion which detects said linear magnetic scale.

In addition, as shown in FIG. 12, the above-mentioned magnetic sensor portion 92 has two electromagnetic conversion elements 149 and 150, consisting of Hall effect elements and so forth, for detecting each of the magnetic poles of the above-mentioned linear magnetic scale 91.

Figure 13:
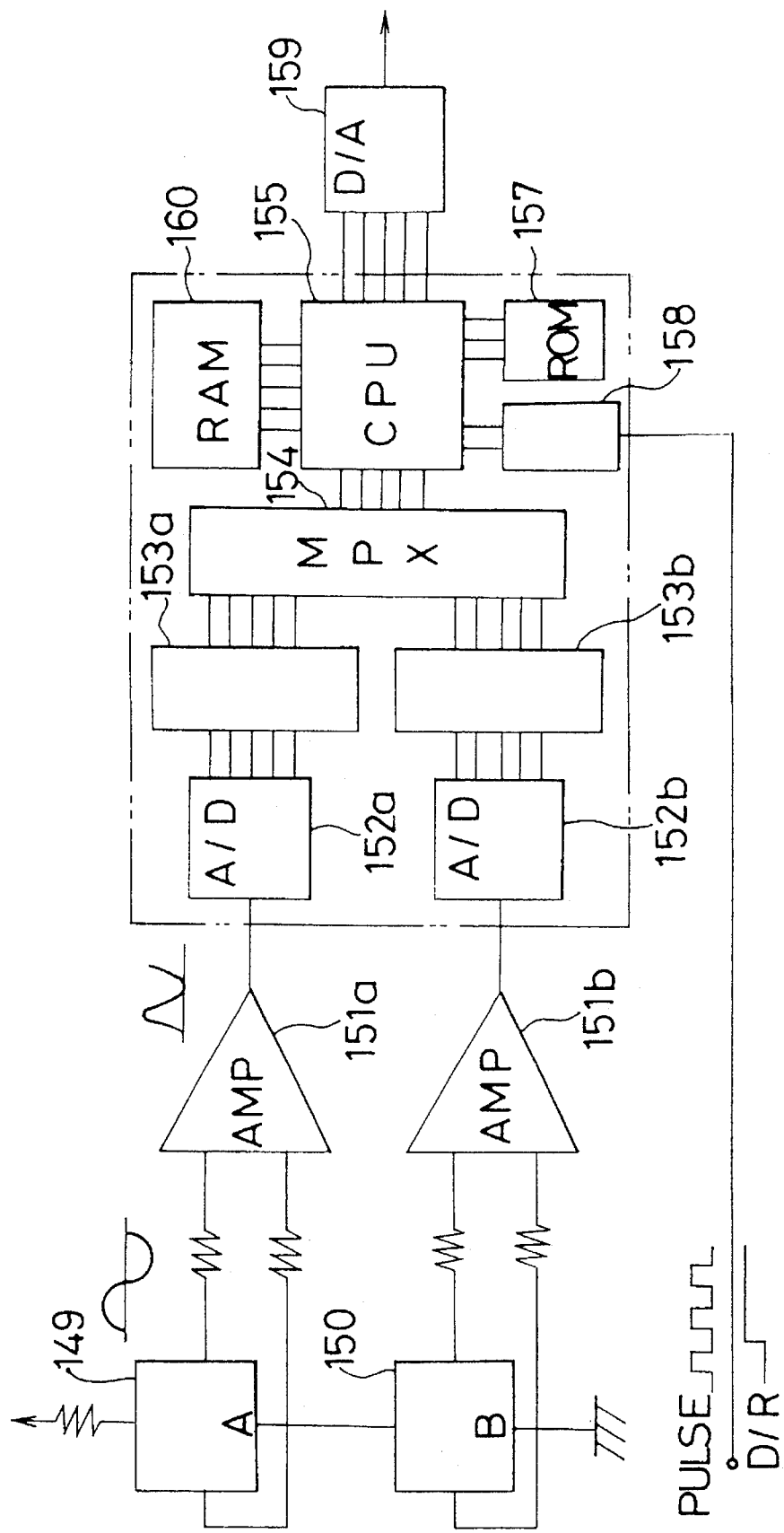
FIG. 13 is a block drawing of the control system which performs operational control of the drive unit shown in FIGS. 3 through 5.

The above-mentioned electromagnetic conversion element 150 is provided shifted by ½ of pitch P between each of the magnetic poles of linear magnetic scale 91 with respect to electromagnetic conversion element 149. As a result, a waveform is obtained which differs in phase by $\pi/2$ with respect to the waveform shown in (A) of FIG. 14. Furthermore, as shown in FIG. 14, although the waveforms obtained from electromagnetic conversion element 149 and electromagnetic conversion element 150 are continuous positive and negative sine waves using the 0 level for the baseline, as shown in FIG. 13, by passing these waveforms through amplification circuits 151a and 151b, amplification processing is performed whereby the waveforms are amplified from the 0 level to the level of Vmax. This is done to facilitate signal processing at a later step.

The following provides an explanation of the constitution of the control system which controls the relative positions of the primary side and secondary side based on the signals emitted from the above-mentioned electromagnetic conversion elements 149 and 150 and so forth.

As shown in FIG. 13, the constitution of the above-mentioned control system is such that waveforms output from electromagnetic conversion element 149 and electromagnetic conversion element 150 are input to amplification circuits 151a and 151b. These amplification circuits 151a and 151b are sequentially connected to A/D conversion circuits 152 and 152b, latching circuits 153a and 153b, and multiplexer (MPX) 154. The output from this multiplexer 154 is then input to CPU (control circuit) 155. In addition, memory (ROM) 157, memory (RAM) 160, a counting device in the form of up-down counter 158 and D/A conversion circuit 159 are connected to CPU 155.

The above-mentioned A/D conversion circuits 152a and 152b convert the analog waveforms amplified by amplification circuits 151a and 151b of the previous step to binary data, each of which is input to latching circuits 153a and 153b, respectively. These latching circuits 153a and 153b latch and hold the data of A/D conversion circuits 152a and 152b of the previous stage in order to perform synchronization processing of said data converted by said A/D conversion circuits 152a and 152b. This held data is then input to multiplexer (MPX) 154. Since this multiplexer (MPX) 154 is unable to simultaneously output data latched with latching circuits 153a and 153b in the case of output to CPU 155 of the following step, time sharing is performed which allows data to be individually output to CPU 155 followed by arithmetic processing of that data.

On the other hand, the detection device described above contains the following constitution in order to detect that the primary and secondary sides that have reached the reference position of their relative movement.

Namely, as shown in FIGS. 4, 5, 7, 11 and 15, electromagnetic conversion element 171, consisting of a Hall effect element and so on, is provided as a detecting element for this detection. As is clear from FIGS. 4 and 7, this electromagnetic conversion element 171 is, more specifically, arranged in the space within, for example, the second armature coil 42 located from the right end of the 14 armature coils 42 equipped on the primary side, and is fixed on circuit substrate 40. Magnetic pole 89a, on the right end of field magnet (shown in FIGS. 11 and 15) 89 possessed by the secondary side, performs the action of a detected element which is detected by said electromagnetic conversion element 171. The above-mentioned electromagnetic conversion element 171 then emits a signal in response to this magnetic pole 89a. This signal is treated as the reference position signal. Furthermore, a magnetic resistance element may be used instead of electromagnetic conversion element 171.

Thus, in said linear direct current motor, a detecting element in the form of electromagnetic conversion element 171 is arranged within an armature coil 42 of the primary side, and the signal emitted by said electromagnetic conversion element 171 in response to field magnet 89 of the secondary side is obtained as the reference position signal of relative movement of the primary and secondary sides. According to said constitution, since only electromagnetic conversion element 171 should be specially provided as a component for obtaining said reference position signal, and since the space within an armature coil 42 is effectively used as the space for its installation, the space occupied by said electromagnetic conversion element 171 is essentially zero. Thus, the overall size of the linear direct current motor can be reduced.

Figure 15:
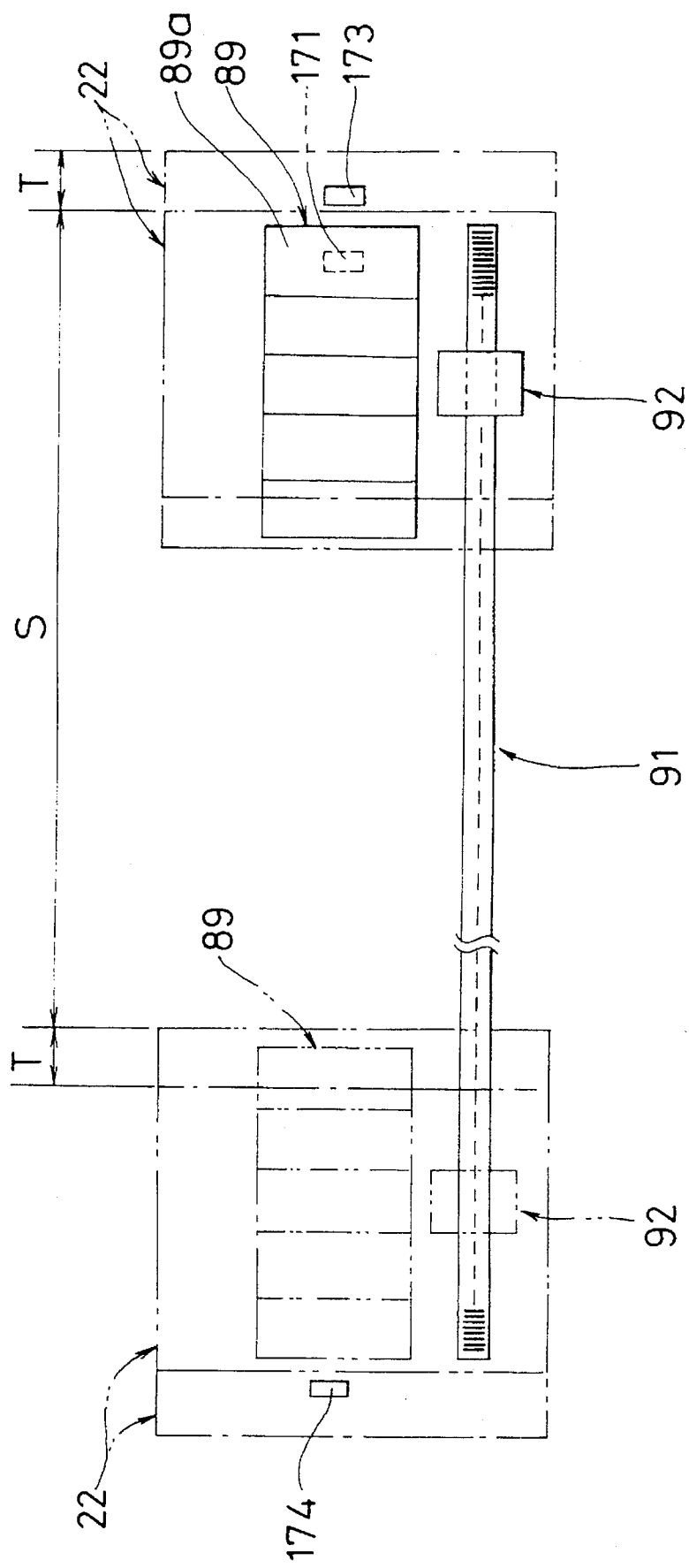
FIG. 15 is a drawing explaining the operation of the drive unit shown in FIGS. 3 through 5.

In FIG. 15, reference numeral S expresses the stroke which enables the above-mentioned relative movement of the primary and secondary sides. In said drawing, the above-mentioned electromagnetic conversion element 171 is located at the end or in the vicinity of the end of this stroke S. However, it is arranged to the inside from the end of stroke S in the present embodiment. In addition, two limit sensors 173 and 174 are provided which emit a signal following detection of operation when said primary and secondary sides have deviated from this stroke S. These limit sensors 173 and 174 are composed of electromagnetic conversion elements or magnetic sensors such as magnetic resistance elements, arranged in the respective spaces within armature coils 42 located on the right and left ends of the 14 armature coils 42 equipped on the primary side, and are fixed on circuit substrate 40. When table 22 deviates by an amount T from the above-mentioned stroke S, signals are respectively emitted in response to the magnetic poles on the right and left ends of field magnet (shown in FIGS. 11 and 15) 89 possessed by the secondary side. Thus, since limit sensors 173 and 174 also employ magnetic sensors which emit a signal in response to field magnet 89, and the space in which they are installed is that within armature coils 42, the space they occupy is essentially zero in the same manner as electromagnetic conversion elements 171 described above, thereby enabling the overall size of the linear direct current motor to be further reduced.

Furthermore, the signals emitted by each of the above-mentioned electromagnetic conversion elements 149, 150 and 171 as well as both of the above-mentioned limit sensors 173 and 174 are sent to a control unit (not shown) which controls operation of said drive unit, thereby enabling said control unit to control operation at the timing described below based on these signals.

The following provides an explanation of the operation of the drive unit having the constitution described above.

When an operation command is emitted by the above-mentioned control unit (not shown) as a result of operation of an operation switch and so forth by the operator, the initial operation consists of the secondary side, which has stopped at an arbitrary location, being moved towards the reference position set at one end of its operation stroke S (see FIG. 15), in this case the right end in FIG. 15. When the secondary side arrives at said reference position, scale position data stored in memory (RAM) 160 is reset according to a reference position signal emitted as a result of electromagnetic conversion element 171 responding to end magnetic pole 89a of field magnet 89 as shown in FIG. 15 and so forth.

The following provides a detailed explanation of the operation through transmission of this reference position signal.

As described above, although the secondary side moves towards the reference position from an arbitrary location according to an operation command, as shown in FIG. 15, it temporarily deviates from the end of stroke S as a result of passing by the end by distance T. As a result, a signal is emitted by limit sensor 173 and the secondary side stops corresponding to this signal. During this deviation operation, since the above-mentioned end magnetic pole 89a of field magnet 89 passes over electromagnetic conversion element 171, a signal is emitted from said electromagnetic conversion element 171. However, the control unit is set so as to not incorporate said signal as a signal. Thus, only the signal emitted by the above-mentioned limit sensor 173 is incorporated into the control unit. This signal from limit sensor 173 acts as an inducing signal to promote the control unit to later recognize the signal emitted from the above-mentioned electromagnetic conversion element 171.

Having received the above-mentioned inducing signal from limit sensor 173, the control unit correspondingly causes the secondary side to operate in the direction opposite to that thus far. This being the case, the above-mentioned end magnetic pole 89a of field magnet 89 again passes over electromagnetic conversion element 171, and a signal is emitted by said electromagnetic conversion element 171. The control unit incorporates this signal as the reference position signal described above and causes the secondary side to stop. Thus, the secondary side is positioned at the reference position and scale position data stored in memory (RAM) 160 is reset as described above.

Furthermore, as described above, the speed during which the secondary side is moved in the direction opposite to that thus far to obtain the reference position signal from electromagnetic conversion element 171 is low speed, while that prior to said operation is high speed. As a result of having said constitution, together with movement to the reference position being performed in a short period of time, the reference position signal can be reliably obtained.

The secondary side begins to move to the desired position as a result of the above-mentioned reset command. Correspondingly, the continuous amplified waveforms having different phases as shown in FIGS. 14(A) and 14(B) are obtained from electromagnetic conversion element 149 and electromagnetic conversion element 150.

Figure 14A:
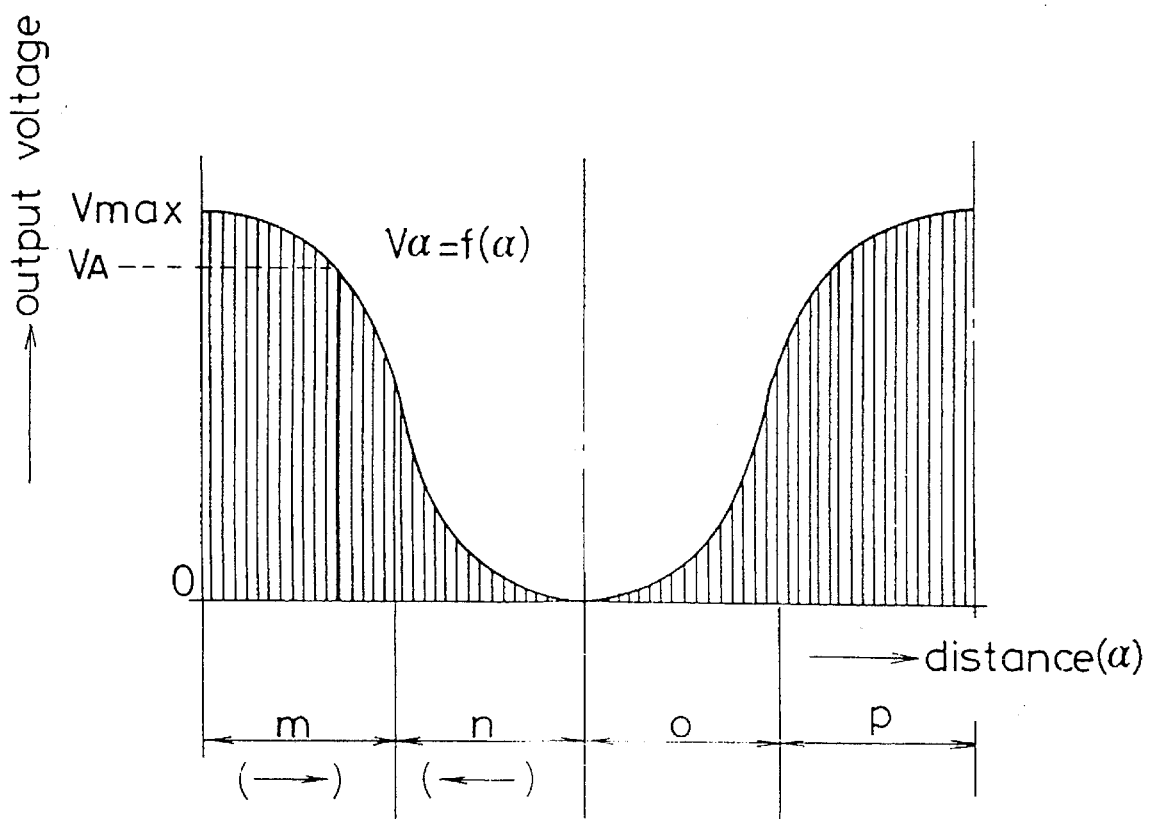
FIG. 14 is a graph showing the waveforms obtained from the magnetic sensor portion shown in FIG. 12.
Figure 14B:
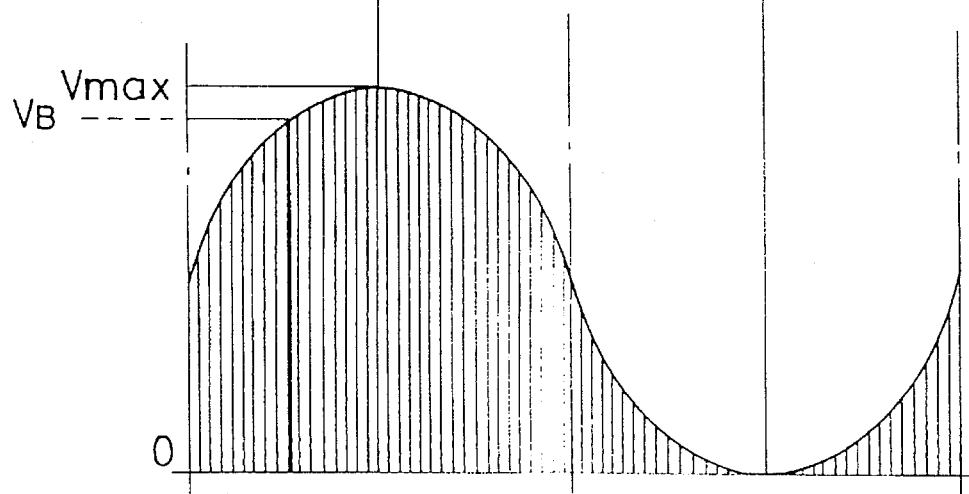

As shown in FIGS. 14(A) and 14(B), in looking, for example, at region m, it can be seen from FIGS. 14(A) and 14(B) that the corresponding waveforms are different for the output data of electromagnetic conversion element 149 and electromagnetic conversion element 150. As a result, CPU 155 is able to determine the direction of movement of the secondary side by comparing this different data.

Next, the amount of movement of the secondary side from the reference position is determined in the following manner.

Namely, in FIG. 12, when the amount of movement of electromagnetic conversion elements 149 and 150 from the reference position is taken to be X, this becomes the amount of movement of the secondary side.

As shown in FIGS. 14(A) and 14(B), the above-mentioned amount of movement X is determined by, for example, determining the voltage ratio of $V_A/V_B$ when the output of electromagnetic conversion element 149 is taken to be $V_A$ and the output of electromagnetic conversion element 150 is taken to be $V_B$. Although voltages in the form of $\alpha \times V_A$ and $\alpha \times V_B$ are obtained according to the change in the gap between, for example, electromagnetic conversion devices 149 and 150 and each of the magnetic poles to be detected by them, there is the risk of arithmetic processing being performed as if movement had occurred despite there only having been a change in the size of this gap. Therefore, by performing processing in the form of $\alpha \times V_A / \alpha \times V_B$ in order to prevent this mechanical error, $\alpha$ is no longer related to the position data, thus allowing the amount of movement to be determined in the form of $V_A/V_B$.

Thus, since precise position data within one pitch (P) corresponding to $V_A/V_B$ is stored in advance in memory 157, CPU 155 is able to determine distance α as shown in FIG. 12 by reading the value of $V_A/V_B$ determined by the above-mentioned arithmetic processing and the corresponding value from memory (ROM) 157 and comparing those values. Since the position data of this determined distance α is stored in memory 160, in which previously determined position data has already been stored (although not stored in memory at the point initially written from the above-mentioned reference position), CPU 155 adds said data to most recently determined distance α after reading that data. As a result, computed distance X is written into memory 160 in the form of position data.

By then repeating this arithmetic processing, the above-mentioned distance X is stored in the above-mentioned memory 160 in the form of position data.

However, up-down counter 158, which counts the pulses applied by the control unit not shown, is connected to CPU 155. This up-down counter 158 is composed to operate in response to reset commands of memory 160. In addition, since the number of pulses generated for 1 pitch (P) shown in FIG. 12 is determined in advance, CPU 155 is able to compute distance X' by counting the number of pulses output from this up-down counter 158.

An amount of deviation is then determined by comparing this determined distance X' and distance X stored in the above-mentioned memory 160. This determined amount of deviation is then output from D/A converter 159 by CPU 155. The secondary side is then driven to the proper position based on this output.

Figure 16:
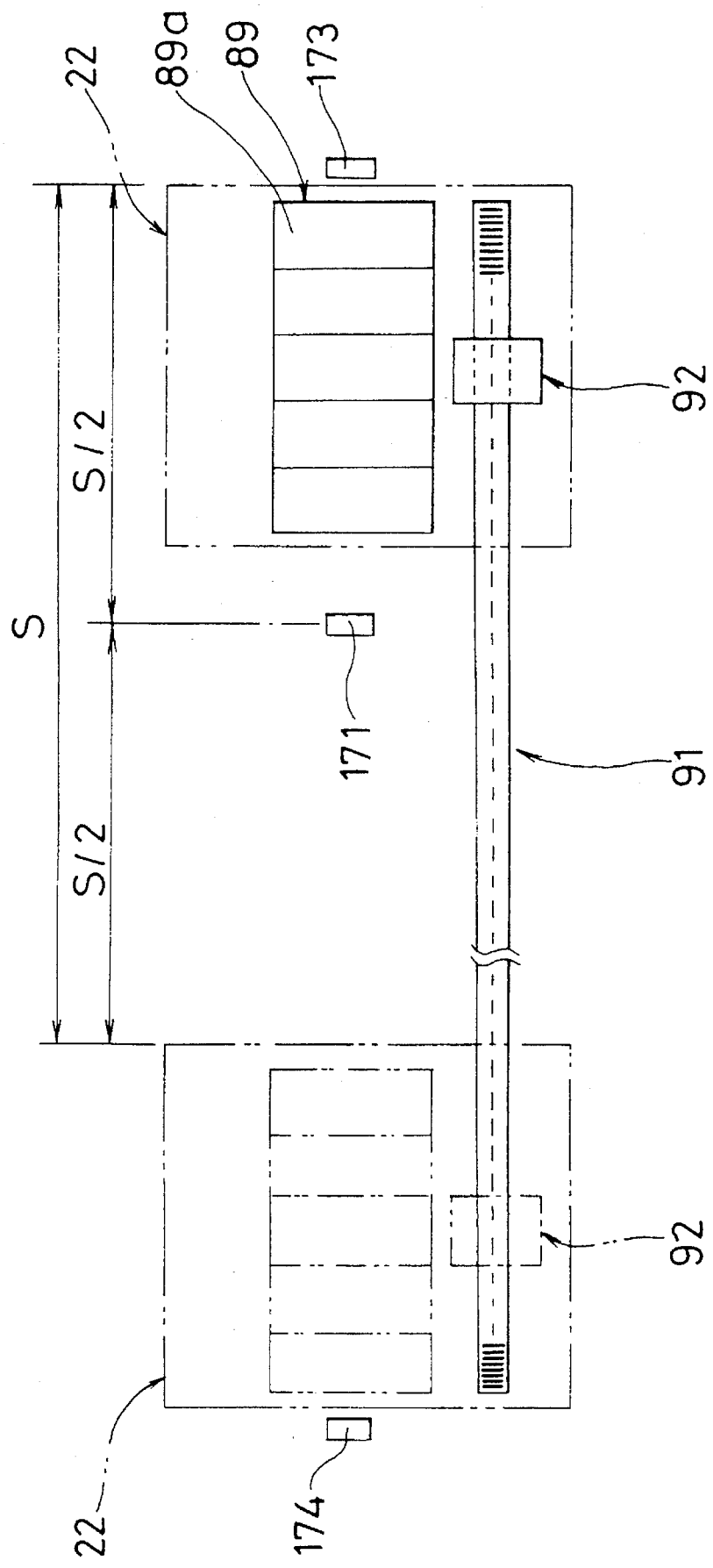
FIG. 16 is a drawing explaining the operation of a drive unit as a second embodiment of the present invention.

Continuing, the following provides an explanation of a drive unit as a second embodiment of the present invention based on FIG. 16. Furthermore, since said drive unit is composed in the same manner as the drive unit as a first embodiment shown in FIGS. 3 through 15 with the exception of the constitution explained below, an overall explanation of the drive unit is omitted, and the explanation only focuses on the essential portion. In addition, those constituent members identical to the constituent members of said drive unit as a first embodiment are shown using the same reference numerals in the following explanation.

As shown in the drawing, in said drive unit, electromagnetic conversion element 171 for generating a reference position signal is arranged at the center of operating stroke S of the secondary side. However, it is still arranged within an armature coil 42 (see FIGS. 3 through 5 and FIG. 7).

Although a control unit (not shown) is provided and limit sensor 173 is used as an inducing signal generating device which emits an inducing signal for promoting recognition of the reference position signal from said electromagnetic conversion element 171 by said control unit in the above-mentioned drive unit of the first embodiment, in the present embodiment, said electromagnetic conversion element 171 itself is used as an inducing signal generating device.

Namely, the secondary side, which has stopped at an arbitrary location, is moved towards one end (either the right end or left end in FIG. 14) of operating stroke S to obtain the reference position signal. This being the case, the detected element in the form of end magnetic pole 89*a* of field magnet 89 passes over electromagnetic conversion element 171, and a signal is emitted by said electromagnetic conversion element 171. This signal is sent to the control unit as an inducing signal, and the control unit correspondingly causes the secondary side to stop at the point the above-mentioned end magnetic pole 89*a* has passed over electromagnetic conversion element 171 by a slight distance using, for example, time control.

Following this operation, the control unit causes the secondary side to operate in the direction opposite to that thus far. This being the case, the above-mentioned end magnetic pole 89*a* of field magnet 89 again passes over electromagnetic conversion element 171, and a signal is emitted from said electromagnetic conversion element 171. The control unit then incorporates this signal as the reference position signal described above and causes the secondary side to stop. Thus, the secondary side is positioned at the reference position and scale position data stored in memory (RAM) 160 is reset as described above.

Furthermore, since the movement of the secondary side to a desired position is the same as the operation of the first embodiment, an explanation of that movement is omitted.

The location at which the above-mentioned electromagnetic conversion element 171 is arranged is not limited to the locations set in the first and second embodiments, but rather may be arranged at any location.

However, in the linear direct current motor described above, coil substrate 40 and circuit substrate 50 are provided separately for each two or more armature coils 42 and their drive circuit. According to said constitution, by either connecting at least one of each separate portion of this coil substrate 40 and circuit substrate 50 with a long, unseparated substrate or removing at least one of the separate portions to shorten said long substrate, an optimum stroke can be obtained which coincides with the operating stroke required by the apparatus and so forth on which said linear direct current motor is to be equipped, thus offering the advantage of contributing to reduced size and reduced cost of said apparatus and so forth while at the same time offering the advantage described below.

Namely, although the above-mentioned electromagnetic conversion element 171 is mounted on coil substrate 40, by individually providing respective circuit portions containing connection terminals for connecting this electromagnetic conversion element 171 to each separate portion of said coil substrate 40, electromagnetic conversion element 171 can be installed at any arbitrary separate portion. In addition, the location of electromagnetic conversion element 171 can be set as desired within each of these separate portions, thus enabling the degree of freedom to be increased.

Furthermore, although a guide unit having a mechanical constitution is indicated for the guiding device which performs mutual guidance of the primary and secondary sides in each of the above-mentioned embodiments, this can also be a guiding device of a constitution wherein both members are relatively levitated by the pressure of a fluid (air or oil) or the magnetic force of a magnet.

In addition, although a moving magnet type of direct current linear motor, wherein the armature coil 42 side is stationary and the magnet 89 side moves, is indicated in each of the above-mentioned embodiments, the present invention can also be applied to a moving coil type of direct current linear motor.

Moreover, the present invention can also be similarly applied in cases of performing curved motion wherein bed 21 has a certain curvature.

In addition, the present invention is not limited to the constitutions of each of the embodiments described above, but rather can naturally realize a diverse range of constitutions by mutually combining one portion each of those constitutions which contains each of these embodiments.

As has been explained above, in the linear direct current motor according to the present invention, a magnetic sensor is arranged within the armature coil of the primary side, the signal emitted as a result of said magnetic sensor responding to a field magnet of the secondary side is obtained as a reference position signal for relative movement of said primary and secondary sides. According to said constitution, only the above-mentioned magnetic sensor should be specially provided as a component for obtaining said reference position signal. Moreover, since the space within an armature coil is used for the installation space of said magnetic sensor, the space occupied by said magnetic sensor is essentially zero. Accordingly, the overall size of the linear direct current motor can be made more compact, thus offering the advantage of contributing to conservation of space by a machine tool or industrial robot and so forth in which said linear direct current motor is to be incorporated.

What is claimed is:

1. A linear direct current motor, comprising:

a primary side containing armature coils;

a moving secondary side having a field magnet, which is magnetized by arranging different magnetic poles alternately along the direction of relative movement with respect to said primary side, and which is arranged in opposition to said armature coils; and a detection device located proximate a path of said field magnet for detecting a relative position of said field magnet of said secondary side with respect to said primary side;

said detection device including a magnetic sensor which is arranged within said armature coils and emits a reference position signal in response to said field magnet, and including a linear magnetic scale adjacent said armature coils which cooperates with said magnetic sensor to provide a signal indicating the relative position of said secondary side with respect to said primary side.

2. The linear direct current motor as set forth in claim 1 wherein said magnetic sensor is arranged at an arbitrary location within the prescribed stroke which enables relative movement of said primary and secondary sides, an inducing signal generating device is provided which operates by the relative movement in a prescribed direction by said primary and secondary sides, and emits an inducing signal for promoting a control unit to recognize the signal from said magnetic sensor, and the signal emitted by said magnetic sensor as a result of causing relative movement in the direction opposite to said prescribed direction by said primary and secondary sides according to said inducing signal is used as said reference position signal.

3. The linear direct current motor as set forth in claim 2 wherein a limit sensor is provided which emits a signal after detecting that said primary and secondary sides have operated deviating from said prescribed stroke, and the signal from said limit sensor is used as said inducing signal.

4. The linear direct current motor as set forth in claim 2 wherein the signal emitted from the magnetic sensor itself which emits said reference position signal is used as said inducing signal.

5. The linear direct current motor as set forth in claim 2 wherein the magnetic sensor which emits said reference position signal is arranged either at the end or in the vicinity of the end of said prescribed stroke.

6. The linear direct current motor as set forth in claim 2 wherein the magnetic sensor which emits said reference position signal is arranged at a location other than the end or the vicinity of the end of said prescribed stroke.

7. The linear direct current motor as set forth in claim 1 wherein the speed when said primary and secondary sides are caused to move to obtain said reference position signal is a speed slower than that prior to such.

8. The linear direct current motor as set forth in claim 1 wherein said primary side has a coil substrate on which said armature coils are supported, and a circuit substrate which performs the supplying of electrical power and so forth to said armature coils, two or more of said armature coils provided on said coil substrate and a drive circuit provided on said circuit substrate are grouped into units and arranged by joining a plurality of said units into a single unit, and said coil substrate and circuit substrate can be mutually divided by separating into said units of armature coils and drive circuit.

9. The linear direct current motor as set forth in claim 8 wherein the location of the magnetic sensor which emits said reference position signal can be set as desired within the separated portions.

10. The linear direct current motor as set forth in claim 1 wherein the magnetic sensor which emits said reference position signal is composed of an electromagnetic conversion element.

11. The linear direct current motor as set forth in claim 1 wherein the magnetic sensor which emits said reference position signal is composed of a magnetic resistance element.

* * * * *